United States Patent
Abe (10) Patent No.: US 8,436,900 B2
(45) Date of Patent: May 7, 2013

(54) PATTERN MATCHING CAMERA (75) Inventor: Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 284 days.

(21) Appl. No.: 12/682,427

(22) PCT Filed: Nov. 20, 2008

(86) PCT No.: PCT/JP2008/071144
§ 371 (c)(1),
(2), (4) Date: Apr. 9, 2010

(87) PCT Pub. No.: WO2009/072403
PCT Pub. Date: Jun. 11, 2009

(65) Prior Publication Data
US 2010/0214407 A1    Aug. 26, 2010

(30) Foreign Application Priority Data

Dec. 4, 2007  (JP) ................................ 2007-313451

(51) Int. Cl.
*H04N 5/225* (2006.01)
(52) U.S. Cl.
USPC ....... 348/135; 382/209; 382/224; 348/208.14
(58) Field of Classification Search ............ 348/208.14, 348/135; 382/209, 103, 217, 224; 600/411
See application file for complete search history.

(56) References Cited

U.S. PATENT DOCUMENTS

| | | | |
|---|---|---|---|
| 2002/0044691 A1 | 4/2002 | Matsugu | |
| 2004/0066970 A1* | 4/2004 | Matsugu | ........................ 382/217 |
| 2005/0008194 A1* | 1/2005 | Sakuma et al. | ............... 382/104 |
| 2005/0008229 A1* | 1/2005 | Sloan et al. | .................... 382/224 |
| 2007/0025722 A1 | 2/2007 | Matsugu et al. | |
| 2007/0081729 A1* | 4/2007 | Ogawa | .......................... 382/209 |
| 2008/0039713 A1* | 2/2008 | Thomson et al. | ............. 600/411 |

(Continued)

FOREIGN PATENT DOCUMENTS

| | | |
|---|---|---|
| JP | A-5-81433 | 4/1993 |
| JP | A-5-196858 | 8/1993 |

(Continued)

OTHER PUBLICATIONS

Mar. 10, 2009 Search Report issued in International Patent Application No. PCT/JP2008/071144 (with translation).

(Continued)

*Primary Examiner* — Jungwon Chang
(74) *Attorney, Agent, or Firm* — Oliff & Berridge, PLC (57) ABSTRACT

A camera includes: an imaging unit that captures an image of a subject and obtains image data; a similarity level calculation unit that calculates a similarity level indicating a level of similarity of an image within a search frame to a template image in correspondence to each search frame position assumed as the search frame is shifted within a search target area set in each of frames input in time series from the imaging unit; a subject position determining unit that determines as a subject position a position assumed by the search frame, at which the similarity level is highest, in correspondence to each frame; a subject tracking unit that tracks the subject position from frame to frame; and a rangefinding unit that measures a distance (subject distance) from the camera to the subject, wherein: the similarity level calculation unit calculates the similarity level by factoring in rangefinding results.

4 Claims, 9 Drawing Sheets

U.S. PATENT DOCUMENTS

| | | | |
|---|---|---|---|
| 2008/0107345 A1* | 5/2008 | Melikian | 382/209 |
| 2008/0137964 A1* | 6/2008 | Takahashi | 382/209 |
| 2009/0141937 A1* | 6/2009 | Abe | 382/103 |
| 2010/0066843 A1* | 3/2010 | Muramatsu | 348/208.14 |

FOREIGN PATENT DOCUMENTS

| | | |
|---|---|---|
| JP | A-9-130714 | 5/1997 |
| JP | A-2001-195582 | 7/2001 |
| JP | A-2002-216129 | 8/2002 |
| JP | A-2006-254321 | 9/2006 |
| JP | A-2007-88644 | 4/2007 |
| JP | A-2007-94536 | 4/2007 |
| JP | A-2007-233544 | 9/2007 |
| WO | WO 2007/125866 A1 | 11/2007 |

OTHER PUBLICATIONS

Office Action issued in Japanese Patent Application No. 2007-313451 dated Feb. 28, 2012.

International Preliminary Report on Patentability issued in International Application No. PCT/JP2008/071144 issued Aug. 10, 2010.

Oct. 4, 2011 Office Action issued in Japanese Patent Application No. 2007-313451 (with translation).

Aug. 7, 2012 Examiner's Decision of Dismissal of Amendment issued in Japanese Patent Application No. 2007-313451 (with translation).

Aug. 7, 2012 Examiner's Decision of Refusal issued in Japanese Patent Application No. 2007-313451 (with translation).

* cited by examiner

PATTERN MATCHING CAMERA

TECHNICAL FIELD

The present invention relates to a camera.

BACKGROUND ART

In a pattern matching method known in the related art, an image is divided into a plurality of areas, template matching processing is executed for each area and the area achieving the highest level of similarity is extracted as a matching area (see patent reference 1).
Patent reference 1: Japanese Laid Open Patent Publication No. H5-81433

DISCLOSURE OF THE INVENTION

Problems to be Solved by the Invention

However, the accuracy of a subject position determined through the pattern matching method in the related art is not high, because the subject position is determined based upon matching results of the pattern matching processing executed on the image.

A camera according to the 1st aspect of the present invention, comprises: an imaging unit that captures an image of a subject and obtains image data; a similarity level calculation unit that calculates a similarity level indicating a level of similarity of an image within a search frame to a template image in correspondence to each search frame position assumed as the search frame is shifted within a search target area set in each of frames input in time series from the imaging unit; a subject position determining unit that determines as a subject position a position assumed by the search frame, at which the similarity level calculated by the similarity level calculation unit is highest, in correspondence to each frame; a subject tracking unit that tracks the subject position determined by the subject position determining unit from frame to frame; and a rangefinding unit that measures a distance (subject distance) from the camera to the subject, wherein: the similarity level calculation unit calculates the similarity level by factoring in rangefinding results provided by the rangefinding unit.

According to the 2nd aspect of the present invention, in the camera according to the 1st aspect, the rangefinding unit determines a rangefinding position in correspondence to each frame based upon the subject position determined by the subject position determining unit.

According to the 3rd aspect of the present invention, in the camera according to the 1st or 2nd aspect, the similarity level calculation unit calculates the similarity level by giving priority to a value closest to the subject distance having been calculated in correspondence to a preceding frame, when selecting a value to be factored in for similarity level calculation from values indicated in the rangefinding results provided by the rangefinding unit.

According to the 4th aspect of the present invention, in the camera according to the 1st or 2nd aspect, the similarity level calculation unit calculates the similarity level by giving priority to a value indicating a closest subject distance when selecting a value to be factored in for similarity level calculation from values indicated in the rangefinding results provided by the rangefinding unit.

ADVANTAGEOUS EFFECT OF THE INVENTION

According to the present invention, the subject position is determined with improved accuracy based upon similarity factors calculated by factoring in the rangefinding results indicating the subject distance.

BRIEF DESCRIPTION OF THE DRAWINGS (FIG. 1) A block diagram showing the structure of the camera achieved in an embodiment.

BEST MODE FOR CARRYING OUT THE INVENTION

Figure 1:
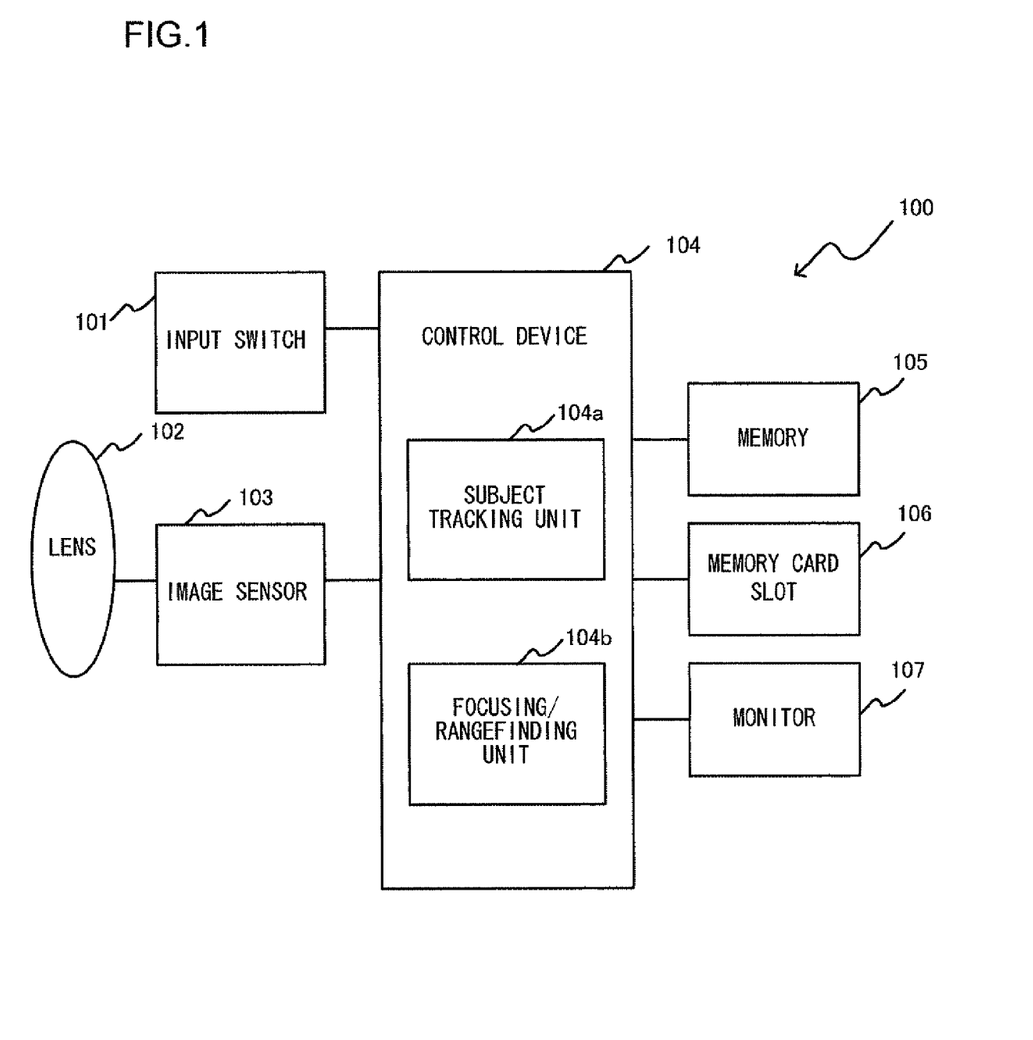

FIG. 1 is a block diagram showing the structure of a subject tracking device achieved as a camera in the first embodiment of the present invention. The camera 100 comprises an input switch 101, a lens 102, an image sensor 103, a control device 104, a memory 105, a memory card slot 106 and a monitor 107.

The input switch 101 includes various input members operated by the user. The input members included in the input switch 101 may be, for instance, a shutter release switch and various operation buttons via which the digital camera 100 is operated.

While the lens 102 is constituted with a plurality of optical lens groups, the plurality of optical lens groups are represented by a single lens in FIG. 1.

The image sensor 103, constituted with, for instance, a CCD, obtains an image by capturing a subject image formed via the lens 102 and outputs image data expressing the captured image to the control device 104. It is to be noted that the image sensor 103 in the camera 100 in the embodiment captures the subject image as the user presses the shutter release button included in the input switch. At this time, a single image may be captured as a still image at the time point at which the shutter release button is pressed or a movie image may be obtained by capturing a plurality of successive frames over predetermined time intervals during the period of time elapsing after the initial press of the shutter release button and the next press of the shutter release button.

In the memory 105, which may be, for instance, a non-volatile flash memory, data constituting a program executed by the control device 104, various parameters to be read during program execution and the like are recorded.

A memory card used as a storage medium is loaded in the memory card slot 106. An image file output from the control device 104 is written into and recorded at the memory card via the memory card slot. In addition, an image file stored in the memory card is read via the memory card slot in response to an instruction issued by the control device 104.

At the monitor 107, which is a liquid crystal monitor (rear-side monitor) installed at the rear surface of the camera 100, an image stored in the memory card, a setting menu in which settings for the camera 100 are selected, or the like is brought up on display.

The control device 104, constituted with a CPU, memory and other peripheral circuits, outputs the image data (still image data or movie image data) input thereto from the image sensor 103, to the monitor 107 where the image is brought up on display and also records the image data into a memory card loaded in the memory card slot 106. It is to be noted that the memory is the control device 104 includes a ROM and RAM.

A subject tracking unit 104a and a focusing rangefinding unit 104b are also included as functional units in the control device 104. Through the processing executed by these functional units in the embodiment, frame-to-frame tracking of a subject present in the images in the individual frames constituting movie image data input from the image sensor 103 is achieved and the image in each frame can be brought into focus. The following is a detailed description of the processing executed by the control device 104 as movie image data are input from the image sensor 103.

Figure 2:
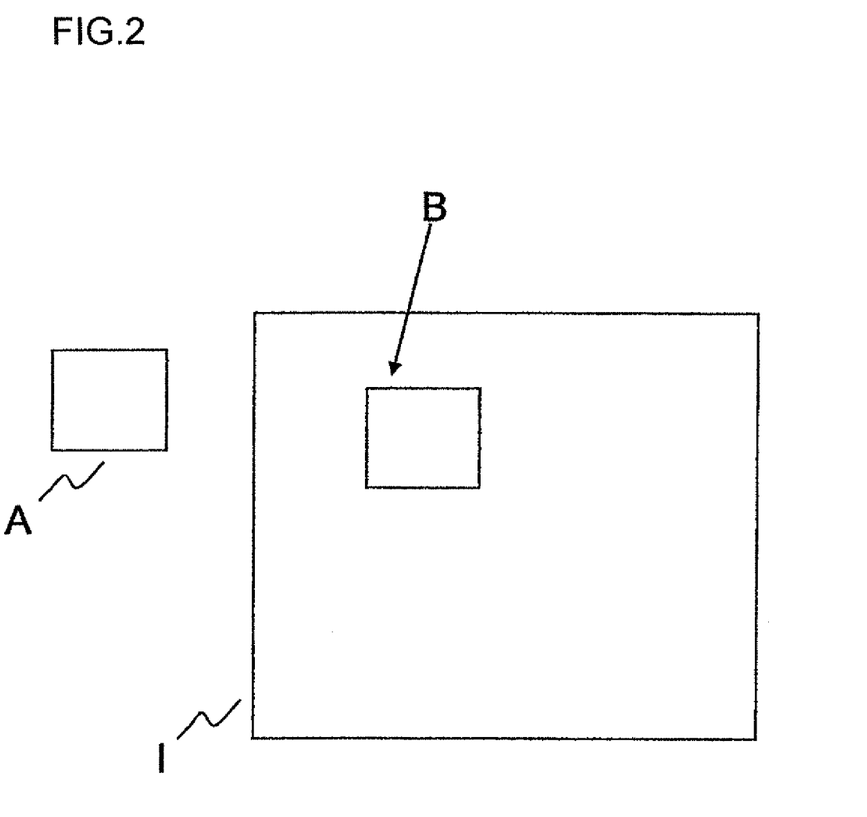
(FIG. 2) A specific example of the target image I, the template image A and the search frame B.

The subject tracking unit 104a executes matching calculation for the image data (target image) in each of image data frames input in time series from the image sensor 103 by using a template image in reference to which the template matching processing is executed. In more specific terms, it determines a subject position within a target image I in reference to a template image A, as shown in FIG. 2. The template image A is obtained based upon an instruction issued by the user.

For instance, the user may specify a range within a first frame of movie image data brought up on display at the monitor 107, in which a frame-to-frame tracking target subject is present, via the input switch 101. As an alternative, the user may specify a range containing the subject by operating the input switch 101 after composing the image so as to set the subject within a search frame B fixed at the center of the image plane.

The subject tracking unit 104a extracts the image within the range specified by the user as the template image A and records the image into the ROM. As an input of movie image data originating from the image sensor 103 starts, the subject tracking unit 104a designates the image in each frame as a target image I and sets the search frame B, the areal size of which matches that of the template image, at a predetermined position on the target image I.

The subject tracking unit 104a executes matching calculation for the image (search frame image) inside the search frame B in reference to the template image A at each position assumed by the search frame B, which is shifted by one pixel at a time within the target image I. Based upon the matching calculation results, the subject tracking unit 104a determines the position assumed by the search frame B containing the search frame image achieving the highest level of similarity to the template image A to be the subject position. As the subject tracking unit 104a executes this processing for each frame of the movie image data input thereto, the subject can be tracked frame by frame.

Figure 3:
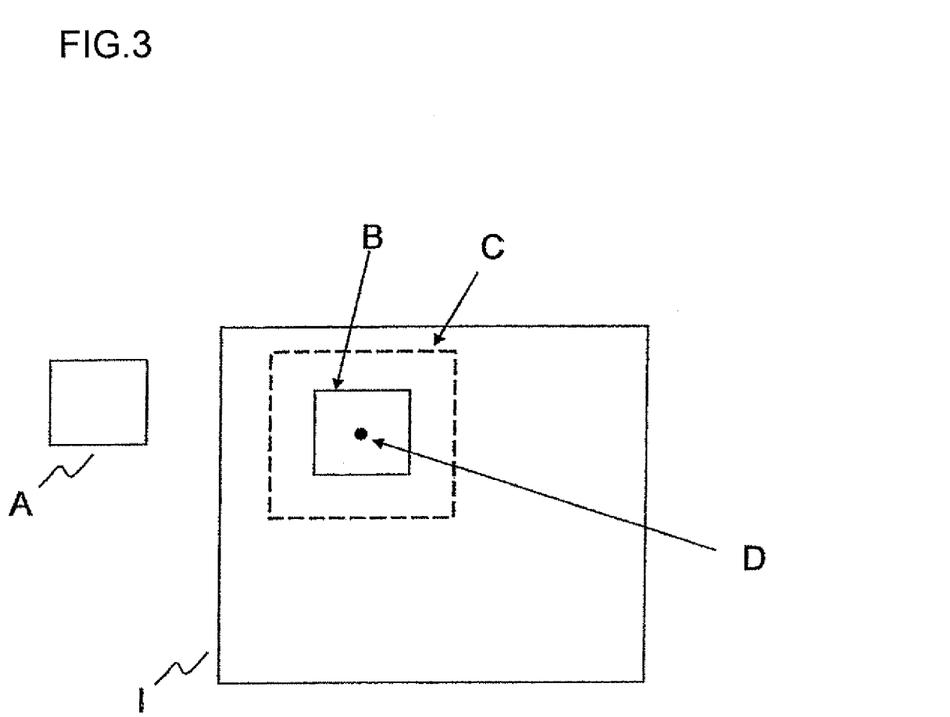
(FIG. 3) A specific example of the search area C set within the target image I.

It is to be noted that the subject tracking unit 104a executes the template matching processing for part of the target image I such as the range C shown in FIG. 3, instead of over the entire target image I. The range C is referred to as a search area in this description. By setting such a search area, the template matching processing can be executed over a specific limited range where the subject is likely to be present and, as a result, the processing can be speeded up. It is to be noted that the search area C should be set within the target image I by ensuring that the coordinates D of the center of the search area C match the coordinates D of the center of the search frame B.

In addition, the search area C should assume a predetermined default areal size in correspondence to the first frame and the areal size of the search area C should be adjusted for the second frame and subsequent frames in correspondence to the maximum similarity level calculated in correspondence to the preceding frame. For instance, if the maximum similarity level calculated in correspondence to the preceding frame is high, the subject tracking unit 104a reduces the areal size of the search area C so as to search the vicinity around the subject position having been determined by assuming that the subject is highly likely to be present within the search area C set in the previous frame. If, on the other hand, the maximum similarity level calculated in correspondence to the preceding frame is low, the subject tracking unit 104a assumes that the likelihood of the subject being present within the search area C is relatively low and accordingly, executes a search over a wider range by increasing the areal size of the search area C. Through these measures, the subject tracking unit is able to execute subject tracking processing with a high degree of efficiency without ever losing the subject.

It is to be noted that while the specific template matching method that may be adopted during this process is of the known art and is thus not described in detail, similarity factors may each be calculated as a residual sum as expressed in (1) below or as a normalized correlation expressed in (2) below. A similarity factor calculated as the residual sum as expressed in (1) assumes a smaller value r to indicate a higher level of similarity between the template image A and the search frame image. A similarity factor calculated as the normalized correlation as expressed in (2), on the other hand, assumes a larger value r to indicate a higher level of similarity between the template image A and the search frame image.

$$r = \sum_m \sum_n |A_{mn} - B_{mn}| \quad (1)$$

$$r = \frac{\sum_m \sum_n (A_{mn} - \overline{A})(B_{mn} - \overline{B})}{\sqrt{\left(\sum_m \sum_n (A_{mn} - \overline{A})^2\right)\left(\sum_m \sum_n (B_{mn} - \overline{B})^2\right)}} \quad (2)$$

Figure 4:
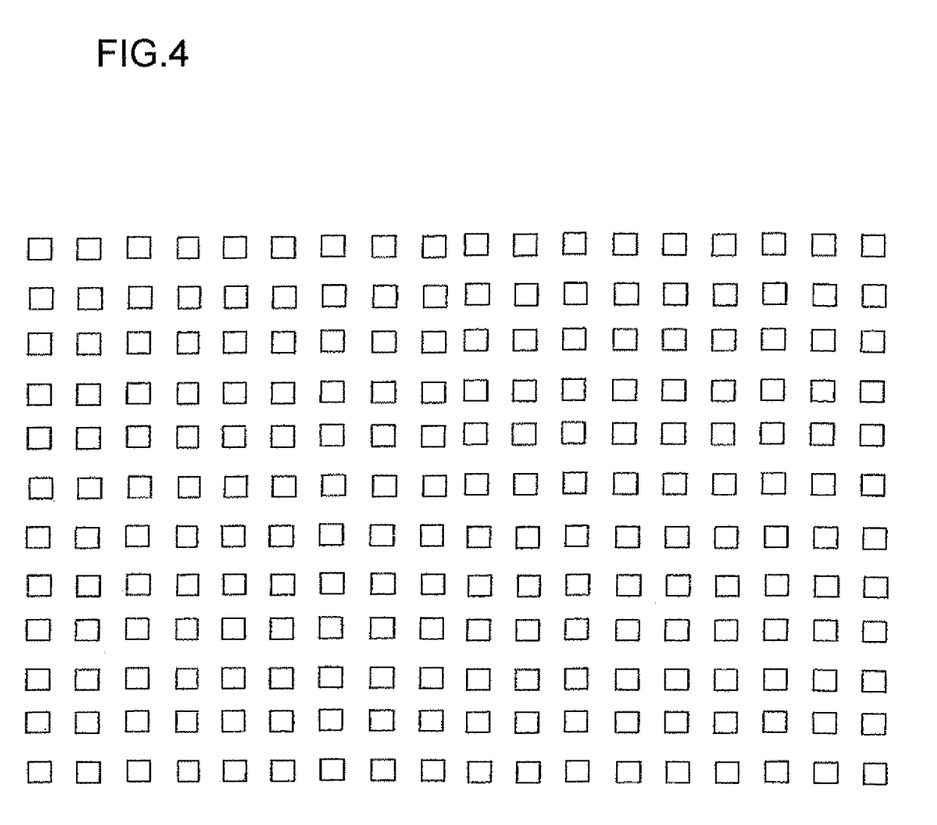
(FIG. 4) An example of a positional arrangement with which AF sensors may be disposed.

The focusing/rangefinding unit 104b executes focusing and distance measurement (rangefinding) for the data within the search frame B. The focusing/rangefinding unit 104b in the embodiment executes the focusing operation through the phase difference method, as described below. FIG. 4 schematically illustrates dedicated sensors (AF sensors) exclusively used for AF (autofocus) processing in the focusing operation executed by adopting the phase difference method. FIG. 4 shows a total of 216 AF sensors (12 (down)×18 (across)).

Figure 5:
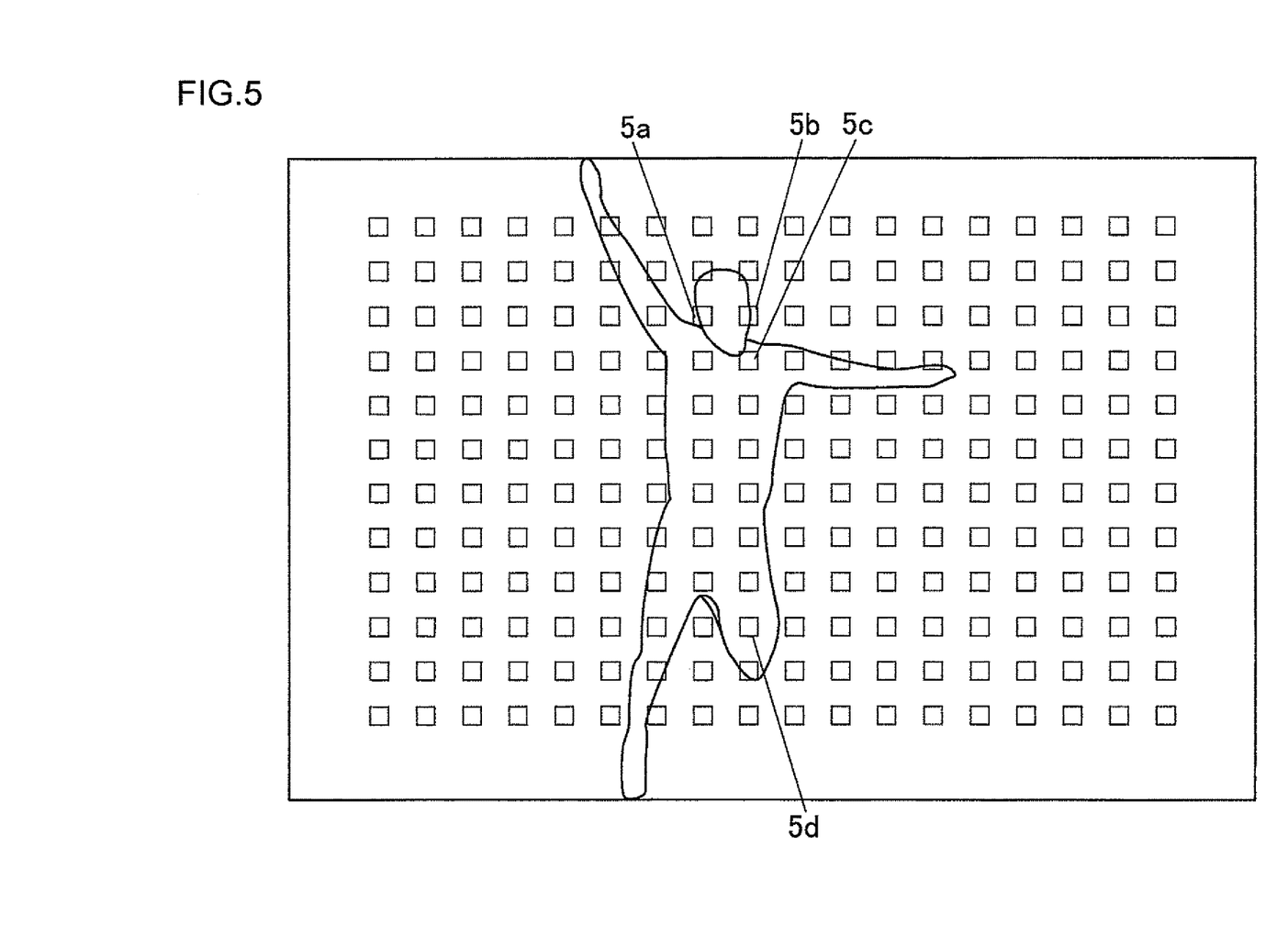
(FIG. 5) A viewfinder image superimposed over the AF sensors.

FIG. 5 shows a viewfinder image superimposed over the AF sensors. It will be desirable that the three AF sensors 5a, 5b and 5c, present around the face of the athlete, be used in the rangefinding operation in the example presented in FIG. 5. However, an AF sensor present within an AF frame selected by the user or an AF sensor closest to the subject (and AF sensor present within the closest range) is usually selected and used in the rangefinding operation. Thus, if the subject is moving at high speed, as the athlete in FIG. 5 is likely to be, the user may experience difficulty in selecting an optimal AF frame or the AF sensor 5d at the athlete's left knee may be automatically selected as the AF sensor within the closest range for the rangefinding operation.

Figure 6:
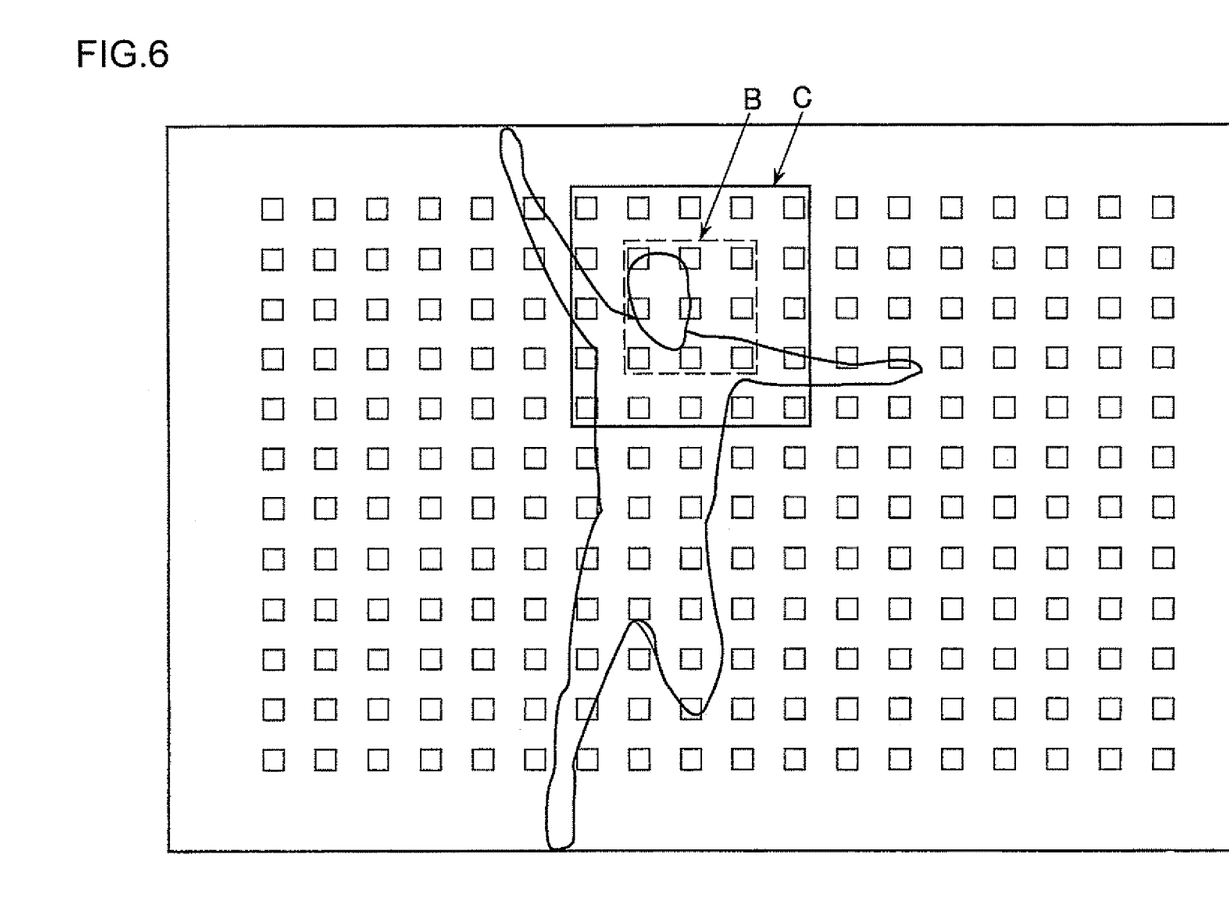
(FIG. 6) The search frame B and the search area C shown together with the viewfinder image superimposed over the AF sensors.
Figure 7:
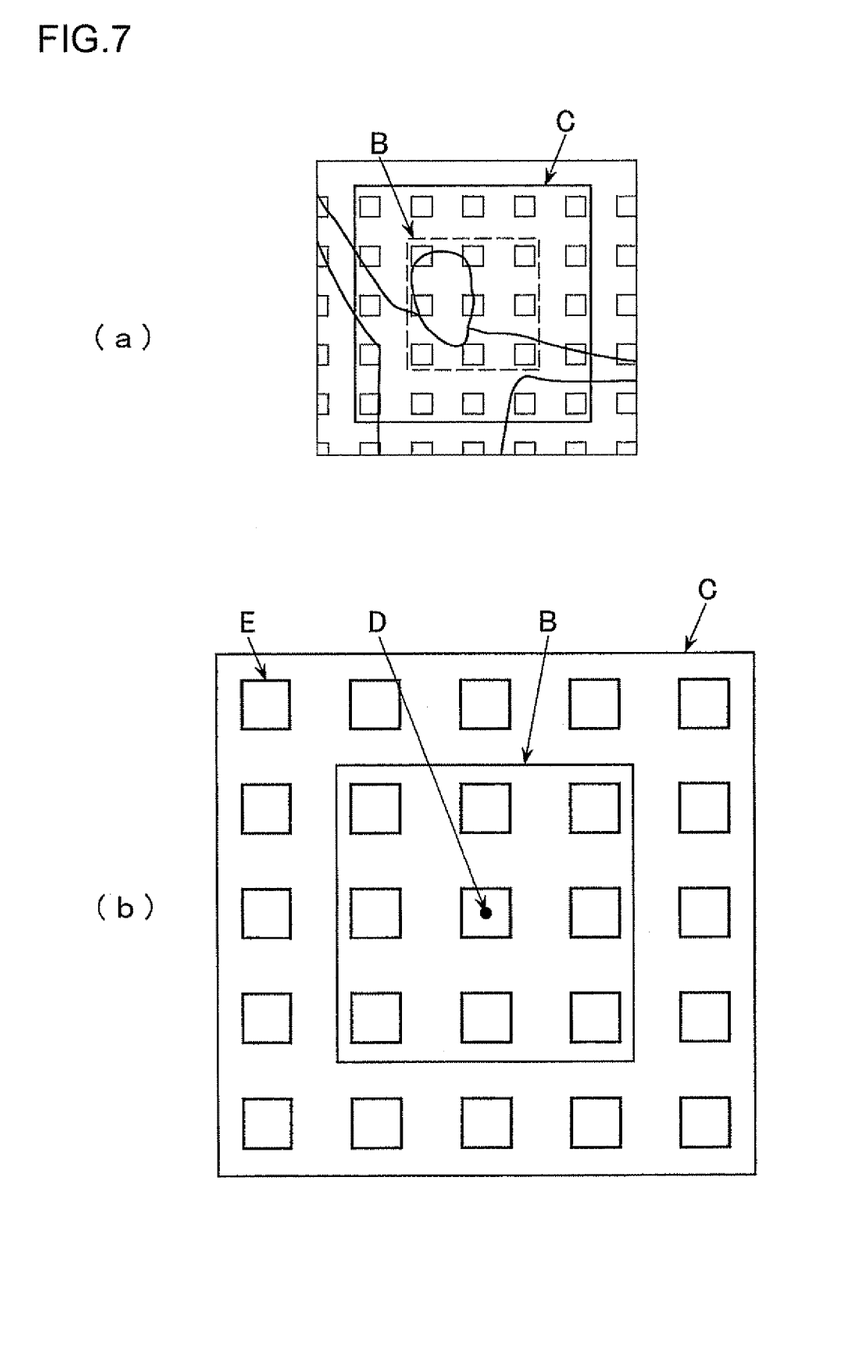
(FIG. 7) A first diagram showing the search area C in an enlargement.

In order to avoid these problematic situations, the focusing/rangefinding unit 104b in the embodiment executes rangefinding operation by using the AF sensors present within a search frame B having been determined to be the subject position by the subject tracking unit 104a, as shown in FIG. 6. Through these measures, rangefinding is executed at all times by designating the subject in which the user is most interested, as the rangefinding target and focus can be adjusted specifically for the subject. It is to be noted that FIG. 7(a) shows in an enlargement the search area C in FIG. 6. In addition, FIG. 7(b) shows the search area C alone minus the viewfinder image.

The focusing/rangefinding unit 104b executes the rangefinding operation by engaging the nine AF sensors present within the search frame B in FIG. 7(b) and executes focusing based upon a representative value selected from the nine rangefinding values. For instance, the focusing/rangefinding unit 104b may select the smallest value among the nine rangefinding values, i.e., the value corresponding to the shortest range, as the representative value and may designate the representative value as the subject distance.

Figure 8:
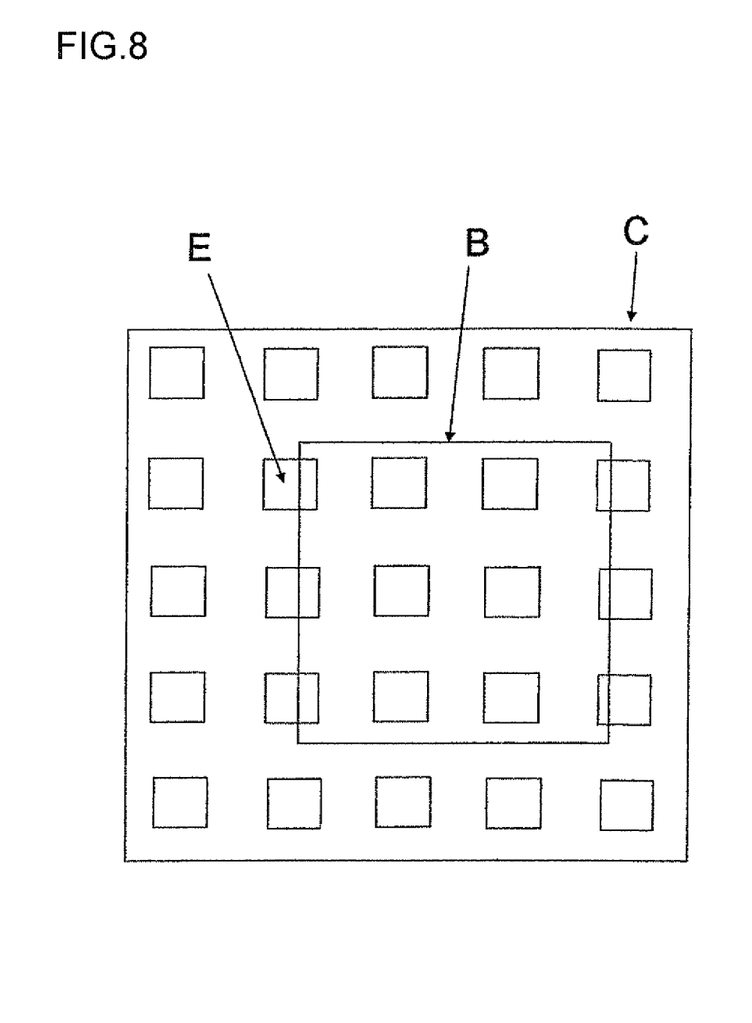
(FIG. 8) A second diagram showing the search area C in an enlargement.

Since the subject tracking unit 104a in the embodiment executes the matching processing by shifting the search frame B by one pixel position at a time within the search area C, as explained earlier, the search frame B, having been determined to be the subject position, may contain only part of an AF sensor, e.g., the AF sensor E, as shown in FIG. 8. Accordingly, the focusing/rangefinding unit 104 calculates rangefinding values only for AF sensors each entirely contained within the search frame B, among the AF sensors present in the search frame B and selects the smallest value among the rangefinding values having been calculated, i.e., the value corresponding to the shortest range, as the representative value.

It is to be noted that the subject tracking unit 104a in the camera 100 in the embodiment calculates the similarity levels mentioned earlier by factoring in the rangefinding results provided by the focusing/rangefinding unit 104b. Thus, since the similarity levels are calculated by reflecting the rangefinding results provided by the focusing/rangefinding unit 104b, the accuracy of the matching processing is improved. In more specific terms, the subject tracking unit 104a executes either processing A or processing B to be described below. It is to be noted that the processing A and the processing B will be described in reference to FIG. 7(b).

(Processing A)

The subject tracking unit 104a calculates the similarity levels each by giving priority to a value closest to the subject distance among values calculated for the preceding frame when selecting the value to be factored in for similarity level calculation from the values indicated by rangefinding results. Accordingly, the subject tracking unit 104a calculates the similarity level by giving priority to the AF sensor indicating rangefinding results closest to the subject distance calculated in correspondence to the preceding frame. In more specific terms, the subject tracking unit 104a calculates the similarity level through matching processing each time the search frame B is shifted to a new position, as explained earlier, and designates the similarity level thus calculated as a similarity level 1. Then, the subject tracking unit 104a designates the AF sensor assuming the position closest to the center D among the AF sensors present in the search frame B at the particular position, as a representative sensor and calculates the difference between the subject distance calculated for the preceding frame and the rangefinding value provided via the representative sensor in the current frame and designates the difference thus calculated as a similarity level 2. The subject tracking unit 104 calculates the final similarity level either by averaging the similarity level 1 and the similarity level 2 or through weighted averaging of weighted similarity levels 1 and 2.

(Processing B)

The subject tracking unit 104a calculates the similarity levels each by taking into consideration the subject distance corresponding to the closest range among the values indicated by the rangefinding results. Accordingly, the subject tracking unit 104a calculates the similarity level by giving priority to the AF sensor, the rangefinding value corresponding to which has been selected by the focusing/rangefinding unit 104b as the representative value through the processing described earlier. In more specific terms, the subject tracking unit 104a calculates the similarity level through matching processing each time the search frame B is shifted to a new position, as explained earlier, and designates the similarity level thus calculated as a similarity level 1. Then, the subject tracking unit 104a designates the AF sensor assuming the position closest to the center D among the AF sensors present in the search frame B at the particular position as a representative sensor and calculates the difference between the representative value selected from the rangefinding values having been calculated for the preceding frame and the rangefinding value provided via the representative sensor in corresponds to the current frame and designates the difference thus calculated as a similarity level 2. The subject tracking unit 104 then calculates the final similarity level either by averaging the similarity level 1 and the similarity level 2 or through weighted averaging of weighted similarity levels 1 and 2.

Figure 9:
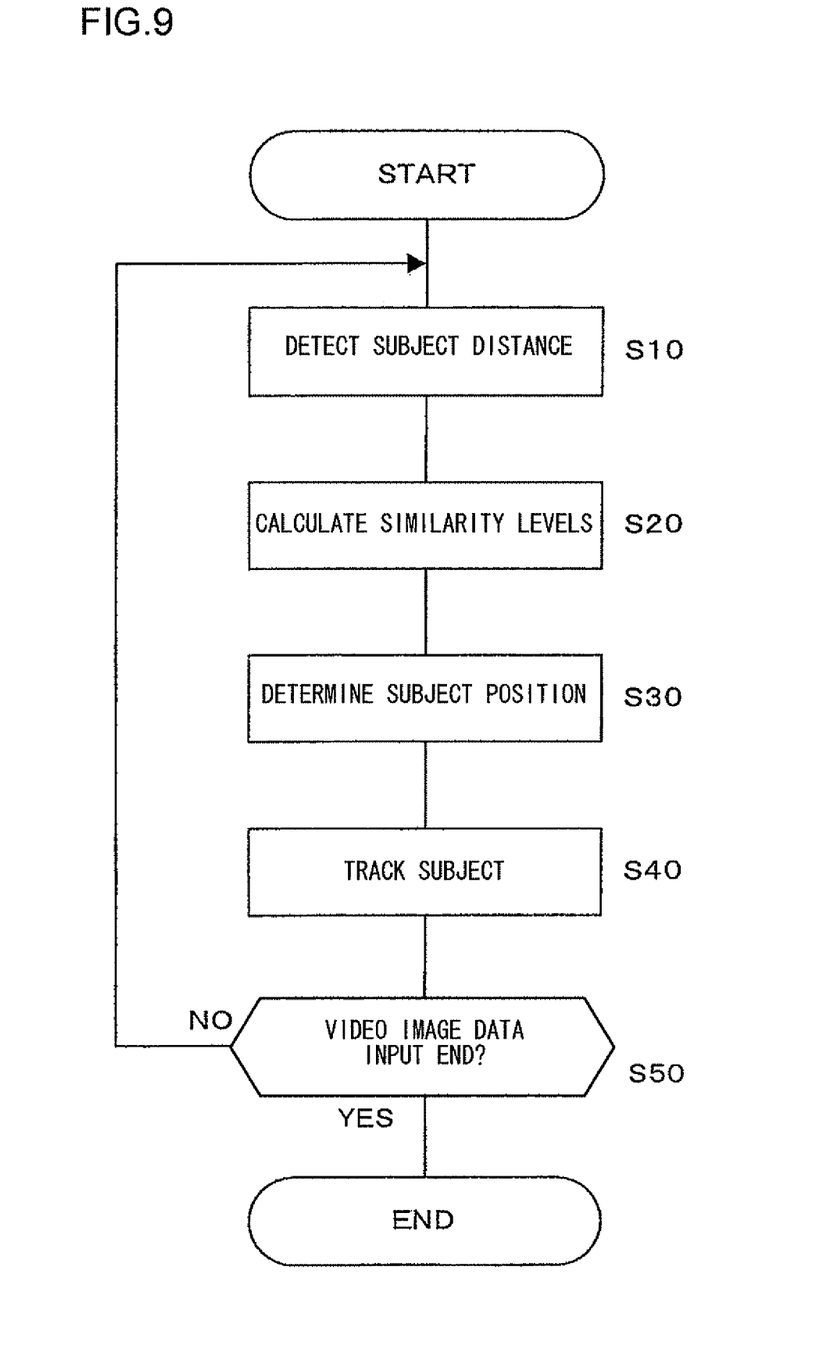
(FIG. 9) A flowchart of the processing executed in the camera 100.

FIG. 9 presents a flowchart of the processing executed by the camera 100 in the embodiment. The processing in FIG. 9 is executed by the control device 104 based upon a program started up as an input of movie image data from the image sensor 103 starts.

In step S10, the focusing/rangefinding unit 104b calculates rangefinding values by designating only the AF sensors each entirely contained in the search frame B among AF sensors present in the search frame B having been determined to be the subject position by the subject tracking unit 104a in correspondence to the preceding frame. Then, it selects the rangefinding value indicating the closest distance to the subject (indicating the closest range) among the rangefinding values and sets the selected value as the subject distance. It is to be noted that since the subject position corresponding to a preceding frame is not available when processing the first frame of image data, the user needs to specify the subject position for the first frame in the embodiment. The processing then proceeds to step S20.

In step S20, the subject tracking unit 104a executes either the processing A or the processing B described above and thus calculates the similarity levels by taking into consideration the rangefinding results provided by the focusing/rangefinding unit 104b. Subsequently, the operation proceeds to step S30, in which the subject tracking unit 104 determines the subject position based upon the similarity levels having been calculated, before the operation proceeds to step S40. In step S40, the subject tracking unit 104a tracks the subject through frame-to-frame tracking of the subject position. The operation then proceeds to step S50.

In step S50, the subject tracking unit 104a makes a decision as to whether or not the movie image data input from the image sensor 103 has ended. If a negative decision is made, the operation returns to step S10 to repeatedly execute the processing from step S10 through S40 for the next frame. If, on the other hand, an affirmative decision is made in step S50, the processing ends.

The following advantages are achieved through the embodiment described above.

(1) The subject tracking unit 104a calculates the similarity level indicating the level of similarity between the image contained in the search frame B and the template image at each search frame position assumed by the search frame B as it is shifted within the search target area C set within each frame of movie image data and determines the position at which the image contained in the search frame B achieves the highest level of similarity, to be the subject position in the particular frame. Then, it tracks the subject position thus determined from frame-to-frame. In addition, the focusing/rangefinding unit 104b measures the distance between the camera and the subject (the subject distance) and the subject tracking unit 104a calculates the similarity levels by factoring in the rangefinding results provided by the focusing/rangefinding unit 104b. Thus, since the subject position can be determined based upon the similarity levels calculated by factoring in the rangefinding results indicating subject distance values, the subject position can be determined with better accuracy.

(2) The focusing/rangefinding unit 104b determines the rangefinding position for each frame based upon the subject position determined by the subject tracking unit 104a. Since this makes it possible to limit AF sensors to be used in the rangefinding operation, the processing speed can be improved.

(3) The subject tracking unit 104a calculates the similarity levels each by giving priority to the value closest to the subject distance having been calculated in correspondence to the preceding frame, when selecting the value to be factored in the similarity level calculation from the values indicated by the rangefinding results provided by the focusing/rangefinding unit 104b (processing A). Or the subject tracking unit 104a calculates the similarity levels each by giving priority to the value indicating the closest subject distance when selecting the value to be factored in the similarity level calculation from the values indicated by the rangefinding results provided by the focusing/rangefinding unit 104b (processing B). As a result, the rangefinding results obtained via an AF sensor disposed at a position where the subject is highly likely to be present in the current frame can be used in the similarity level calculation.

—Example of Variation—

It is to be noted that the camera achieved in the embodiment as described above allows for the following variation.

(1) The subject tracking unit 104a in the embodiment described above tracks the subject in movie image data input from the image sensor 103. However, it may instead execute frame-to-frame tracking of a subject in through images obtained in time series at the image sensor 103 and brought up on display at a monitor 107.

While the invention has been particularly shown and described with respect to a preferred embodiment and a variation thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:
Japanese Patent Application No. 2007-31345, filed Dec. 4, 2007

The invention claimed is:

1. A camera, comprising:
an imaging unit that captures an image of a subject and obtains image data;
a similarity level calculation unit that calculates a similarity level indicating a level of similarity of an image within a search frame to a template image in correspondence to each search frame position assumed as the search frame is shifted within a search target area set in each of frames input in time series from the imaging unit;
a subject position determining unit that determines as a subject position a position assumed by the search frame, at which the similarity level calculated by the similarity level calculation unit is highest, in correspondence to each frame;
a subject tracking unit that tracks the subject position determined by the subject position determining unit from frame to frame; and
a rangefinding unit that measures a distance (subject distance) from the camera to the subject present in each of the frames input in time series, wherein:
the similarity level calculation unit calculates the similarity level for each of the frames input in time series by factoring in rangefinding results provided by the rangefinding unit.

2. A camera according to claim 1, wherein:
the rangefinding unit determines a rangefinding position in correspondence to each frame based upon the subject position determined by the subject position determining unit.

3. A camera, comprising:
an imaging unit that captures an image of a subject: and obtains image data;
a similarity level calculation unit that calculates a similarity level indicating a level of similarity of an image within a search frame to a template image in correspondence to each search frame position assumed as the search frame is shifted within a search target area set in each of frames input in time series from the imaging unit;
a subject position determining unit that determines as a subject position a position assumed by the search frame, at which the similarity level calculated by the similarity level calculation unit is highest, in correspondence to each frame;
a subject tracking unit that tracks the subject position determined by the subject position determining unit from frame to frame; and
a rangefinding unit that measures a distance (subject distance) from the camera to the subject,
wherein:
the similarity level calculation unit calculates the similarity level by factoring in rangefinding results provided by the rangefinding unit, and
the similarity level calculation unit calculates the similarity level by giving priority to a value closest to the subject distance having been calculated in correspondence to a preceding frame, when selecting a value to be factored in for similarity level calculation from values indicated in the rangefinding results provided by the rangefinding unit.

4. A camera, comprising:
an imaging unit that captures an image of a subject and obtains image data:
a similarity level calculation unit that calculates a similarity level indicating a level of similarity of an image within a search frame to a template image in correspondence to each search frame position assumed as the search frame is shifted within a search target area set in each of frames input in time series from the imaging unit;

a subject position determining unit that determines as a subject position a position assumed by the search frame, at which the similarity level calculated by the similarity level calculation unit is highest, in correspondence to each frame;

a subject tracking unit that tracks the subject position determined by the subject position determining unit from frame to frame; and a rangefinding unit that measures a distance (subject distance) from the camera to the subject, wherein:

the similarity level calculation unit calculates the similarity level by factoring in rangefinding results provided by the rangefinding unit, and the similarity level calculation unit calculates the similarity level by giving priority to a value indicating a closest subject distance when selecting a value to be factored in for similarity level calculation from values indicated in the rangefinding results provided by the rangefinding unit.

* * * * *